June 24, 1930.  W. DEPFER  1,768,192
LICENSE PLATE HOLDER FOR AUTOMOBILES
Filed Nov. 14, 1928

Inventor
W. Depfer
By Lacey & Lacey, Attorneys

Patented June 24, 1930

1,768,192

UNITED STATES PATENT OFFICE

WILLIAM DEPFER, OF DONORA, PENNSYLVANIA

LICENSE-PLATE HOLDER FOR AUTOMOBILES

Application filed November 14, 1928. Serial No. 319,326.

The present invention is directed to improvements in license plate holders for automobiles.

The primary object of the invention is to provide simple and efficient means for securing the license plate to the usual bracket without the aid of screw drivers, wrenches or other tools.

Another object of the invention is to provide a device of this kind so constructed that an old license plate can be easily and quickly removed and a new one substituted therefor.

A further object of the invention is to provide a device of this kind so constructed that it will firmly hold the license plate secured to the bracket in a manner to prevent accidental disengagement thereof.

Another object of the invention is to provide a device of this kind which is durable, efficient in operation, cheap to manufacture, and one which will last indefinitely.

With these and other objects in view, this invention resides in the novel features of construction, formation, combination and arrangement of parts to be hereinafter more fully described, claimed and illustrated in the accompanying drawing, in which:—

Figure 1:
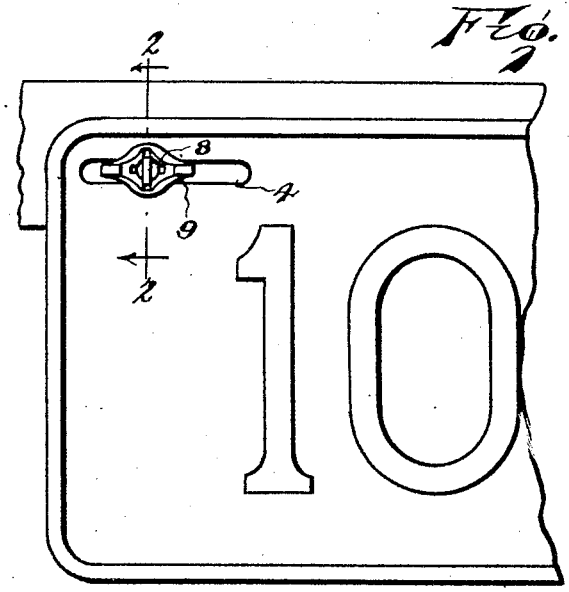
Figure 1 is a front view of the device, showing it in position for securing the license plate in place.
Figure 1:
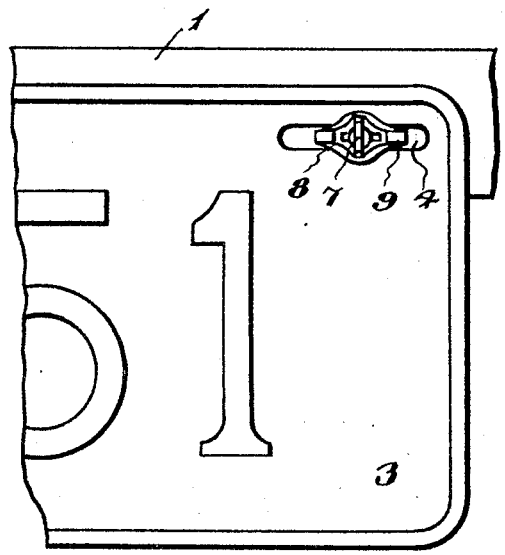

Referring to the drawing, 1 designates a section of a conventional form of bracket mounted upon the automobile, said bracket having spaced openings 2 formed therein, as customary.

The license plate 3 is provided with the usual slots 4 to coincide with the openings 2 for the reception of the securing device.

Figure 2:
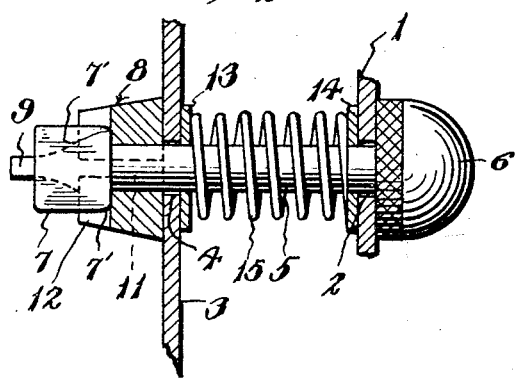
Figure 2 is a sectional view on line 2—2 of Figure 1.
Figure 3:
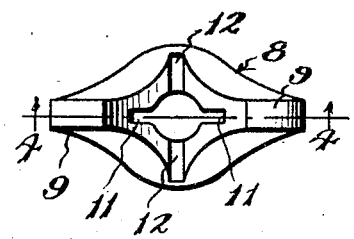
Figure 3 is a front view of the nut.
Figure 5:
Figure 5 is a side view of the bolt.
Figure 4:
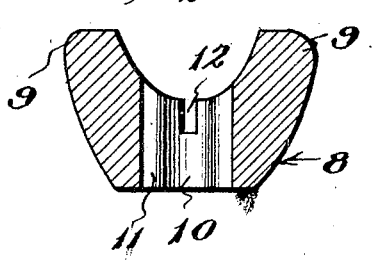
Figure 4 is a sectional view on line 4—4 of Figure 3.

The securing device comprising a threadless bolt 5, the outer end of which is provided with a conical head 6, the shank of said bolt being adapted to pass through the openings 2 and slots 4 of the bracket and license plate, as more clearly illustrated in Figure 2 of the drawing. Obviously when the securing device is in place the head will rest upon the inner surface of the bracket 1.

The outer end of the bolt shank is provided with an integrally connected wing 7 which is of a width greater than the diameter of the bolt shank, the rear end of the wing constituting shoulders 7', the purpose of which will be later explained.

A threadless nut 8 is provided, said nut having oppositely spaced wings 9 to facilitate the rotation thereof. The bore 10 of the nut is formed with diametrically opposed grooves 11. The nut is further provided with oppositely disposed notches 12 arranged at right angles with respect to the grooves 11.

Figure 6:
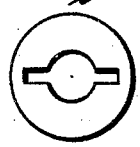
Figure 6 is a view of one of the washers used in connection with the device.

Washers 13 and 14 are engaged upon the shank of the bolt, said washers being of the form shown in Figure 6 in order that the same can be conveniently passed over the wing 7.

Encircling the bolt shank and interposed between the bracket 1 and license plate 3 is a coil spring 15.

To secure a license plate to the bracket the bolts are first passed through the openings 2, spring 15 and through the slots 4, after which the nut is positioned so that the sides of the wings 7 will pass through the grooves 11. Upon forcing the nut inwardly the spring 15 will be compressed. After the nut has been forced to the proper position the nuts are given a quarter turn in order that the notches 12 will aline with the shoulders 7' of the wing 7. Pressure upon the nut is then relieved, whereupon the spring 5 will force the plate 3 outwardly for a slight distance to cause the shoulders 7' to seat in the notches 12, at which time the spring 15 will positively maintain the shoulders 7' seated in the notches 12. To remove the nut it is only necessary to force the same inwardly against the tension of the spring 5 until the shoulders 7' disengage the notches 12, whereupon the nut is turned one quarter revolution to permit the sides of the wings to pass through the grooves 11.

From the foregoing, it is thought that the construction, operation and many advantages of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:—

A holder comprising an unthreaded bolt adapted to be passed through alined openings formed in a support and an article to be held and having a head at one end to bear against the support, the other end of the bolt being provided with a flat wing extending longitudinally of the bolt and projecting from opposite sides thereof, a nut having an unthreaded bore to receive said bolt and slots leading from opposite sides of the bore for passage of the projecting side portions of the wing through the nut, the outer face of the nut having grooves formed therein leading from opposite sides of the bore between said slots and constituting seats to receive the projecting side portions of said wing and prevent outward movement of the nut off the bolt, wings projecting outwardly from the nut with the bore and slots disposed between the same, the wing of said bolt being spaced from the wings of the nut when seated in said notches and adapted to be grasped to facilitate rotation of the nut and bolt relative to each other, and a spring coiled about said bolt to bear against the support and article and yieldably resist movement of the nut and wing of the bolt away from each other.

In testimony whereof I affix my signature.

WILLIAM DEPFER. [L. S.]